(12) United States Patent
Batista et al.

(10) Patent No.: US 10,980,275 B2
(45) Date of Patent: Apr. 20, 2021

(54) KIT COMPRISING A MODULE AND AN ELECTRICALLY OPERATED AEROSOL-GENERATING SYSTEM

(71) Applicant: Philip Morris Products S.A., Neuchatel (CH)

(72) Inventors: Rui Nuno Batista, Morges (CH); Stephane Antony Hedarchet, Pully (CH)

(73) Assignee: Philip Morris Products S.A., Neuchatel (CH)

( * ) Notice: Subject to any disclaimer, the term of this patent is extended or adjusted under 35 U.S.C. 154(b) by 642 days.

(21) Appl. No.: 15/561,801

(22) PCT Filed: Apr. 1, 2016

(86) PCT No.: PCT/EP2016/057289
§ 371 (c)(1),
(2) Date: Sep. 26, 2017

(87) PCT Pub. No.: WO2016/156609
PCT Pub. Date: Oct. 6, 2016

(65) Prior Publication Data
US 2018/0110262 A1   Apr. 26, 2018

(30) Foreign Application Priority Data

Apr. 2, 2015  (EP) .................................. 15162512

(51) Int. Cl.
*A24F 47/00* (2020.01)
*H04L 12/28* (2006.01)
(Continued)

(52) U.S. Cl.
CPC .............. *A24F 47/008* (2013.01); *G06F 1/26* (2013.01); *H02J 7/0068* (2013.01);
(Continued)

(58) Field of Classification Search
CPC ........ A24F 47/008; A24F 47/00; A24F 40/00; H01L 12/00; H01L 12/28
See application file for complete search history.

(56) References Cited

U.S. PATENT DOCUMENTS

2009/0320863 A1   12/2009  Fernando et al.
2013/0032157 A1    2/2013  Markel
(Continued)

FOREIGN PATENT DOCUMENTS

CN    202721463 U    2/2013
CN    203087529 U    7/2013
(Continued)

OTHER PUBLICATIONS

Combined Office Action and Search Report dated Oct. 29, 2019 in Chinese Patent Application No. 201680016632.4, 21 pages (with English translation).

(Continued)

*Primary Examiner* — Michael H. Wilson
*Assistant Examiner* — Dionne W. Mayes
(74) *Attorney, Agent, or Firm* — Oblon, McClelland, Maier & Neustadt, L.L.P.

(57) ABSTRACT

There is provided a kit including a module and an electrically operated aerosol-generating system. The electrically operated aerosol-generating system includes an electric heater configured to heat an aerosol-generating substrate, a supply of electrical energy, a data coupling, and a system attachment connector. The module includes a data connector configured to connect to the data coupling of the electrically operated aerosol-generating system, and a module attachment connector configured to cooperate with the system attachment connector on the electrically operated aerosol-generating system to attach the module to the electrically operated aerosol-generating system.

12 Claims, 2 Drawing Sheets

(51) Int. Cl.
   *G06F 1/26* (2006.01)
   *H02J 7/00* (2006.01)
(52) U.S. Cl.
   CPC ............ *H04L 12/2803* (2013.01); *H02J 7/00* (2013.01); *H04L 2012/2841* (2013.01); *H04L 2012/2847* (2013.01)

(56) References Cited

U.S. PATENT DOCUMENTS

| | | | |
|---|---|---|---|
| 2013/0206154 A1 | 8/2013 | Fernando et al. | |
| 2014/0305450 A1* | 10/2014 | Xiang | A24F 47/008 131/329 |
| 2015/0007838 A1* | 1/2015 | Fernando et al. | A24F 47/00 131/329 |
| 2017/0273358 A1* | 9/2017 | Batista et al. | A24F 47/008 |
| 2018/0192709 A1* | 7/2018 | Alarcon et al. | A24F 47/00 |

FOREIGN PATENT DOCUMENTS

| | | |
|---|---|---|
| CN | 203446536 U | 2/2014 |
| CN | 103997921 A | 8/2014 |
| CN | 104470385 A | 3/2015 |
| CN | 105792690 A | 7/2016 |
| EP | 2 110 034 A1 | 10/2009 |
| FR | 2 879 746 A1 | 6/2006 |
| JP | 3112106 U | 8/2005 |
| JP | 2011-517567 A | 6/2011 |
| KZ | 27 104 B | 6/2013 |
| RU | 2 517 125 C2 | 5/2014 |
| WO | WO 2012/164009 A2 | 12/2012 |
| WO | WO 2014/008623 A1 | 1/2014 |
| WO | WO 2016/023809 A1 | 2/2016 |

OTHER PUBLICATIONS

Combined Office Action and Search Report dated Jun. 26. 2019 in Russian Patent Application No. 2017134670, 20 pages (with English translation).

International Search Report and Written Opinion dated Jun. 8, 2016 in PCT/EP2016/057289, filed Apr. 1, 2016.

Notification of Reasons for Refusal dated Jun. 22, 2020 in Japanese Patent Application No. 2017-550828 (with English language translation), 8 pages.

Combined Chinese Office Action and Search Report dated Jul. 2, 2020 in Patent Application No. 201680016632.4 (with English language translation), 19 pages.

\* cited by examiner

KIT COMPRISING A MODULE AND AN ELECTRICALLY OPERATED AEROSOL-GENERATING SYSTEM

The present invention relates to a module for an electrically operated aerosol-generating system and a kit comprising the module and an electrically operated aerosol-generating system.

One type of aerosol-generating system is an electrically operated smoking system. Handheld electrically operated smoking systems consisting of an electric heater, a battery, control electronics, and an aerosol-generating substrate are known. In some cases, an electrically operated smoking system comprises an aerosol-generating device housing the battery and control electronics and a replaceable aerosol-generating article comprising the aerosol-generating substrate. The electric heater may form part of the aerosol-generating device or part of the aerosol-generating article. Alternatively, the electric heater may be provided separately from the aerosol-generating device and the aerosol-generating article, in which case the heater, the device and the article are combined to form the electrically operated smoking system.

The portion of the electrically operated smoking system comprising the control electronics, which in some cases is an aerosol-generative device, is usually designed for re-use with a plurality of replaceable aerosol-generating substrates. A reusable aerosol-generating device may reduce the cost of an aerosol-generating system for a consumer by requiring the consumer to replace only a replaceable aerosol-generating article comprising the aerosol-generating substrate. However, to further reduce the complexity and cost of the aerosol-generating device, the functionality provided by the control electronics is often reduced to simple control of the electric heater with no means for the consumer to modify or update the functions provided by the aerosol-generating device. Therefore, over time, the aerosol-generating device may become outdated, which may require the consumer to invest in an entirely new aerosol-generating device, or the consumer may continue using their current aerosol-generating device but find themselves prevented from using new aerosol-generating articles that are compatible only with newer aerosol-generating devices.

Therefore, it would be desirable to provide a consumer with cost-effective means for improving or adding new functions to an aerosol-generating system.

According to a first aspect of the present invention, there is provided a kit comprising a module and an electrically operated aerosol-generating system. The electrically operated aerosol-generating system comprises an electric heater for heating an aerosol-generating substrate, a supply of electrical energy, a data coupling, and a system attachment connector. The module comprises a data connector for connecting to the data coupling of the electrically operated aerosol-generating system, and a module attachment connector for cooperating with the system attachment connector on the electrically operated aerosol-generating system for attaching the module to the electrically operated aerosol-generating system. The module also comprises at least one module data storage device configured for at least one of: storing data comprising a set of instructions for execution by a microprocessor; storing data for transmission to the electrically operated aerosol-generating system via the data connector; and storing data received from the electrically operated aerosol-generating system via the data connector. External dimensions of the module define a first volume and external dimensions of the electrically operated aerosol-generating system define a second volume, wherein the second volume is greater than the first volume.

According to a second aspect of the present invention, there is provided a module for an electrically operated aerosol-generating system, the module comprising a data connector for connecting to a data coupling of the electrically operated aerosol-generating system.

According to a third aspect of the present invention there is provided a kit comprising a module according to the second aspect of the present invention and an electrically operated aerosol-generating system. The electrically operated aerosol-generating system comprises an aerosol-generating substrate, an electric heater for heating the aerosol-generating substrate, a supply of electrical energy, and a data coupling for connecting to the data connector of the module.

As used herein, the term "aerosol-generating system" refers to a system for releasing volatile compounds, which can form an aerosol, from an aerosol-generating substrate. The aerosol-generating system may comprise the aerosol-generating substrate. In certain embodiments, the aerosol-generating system may comprise an aerosol-generating substrate capable of releasing upon heating volatile compounds, which can form an aerosol.

Advantageously, the module and system attachment connectors facilitate direct attachment of the module to the aerosol-generating system. Advantageously, the module and system attachment connectors facilitate the module remaining attached to the aerosol-generating system during use of the aerosol-generating system.

Preferably, the external dimensions of the module define a first volume, wherein external dimensions of the electrically operated aerosol-generating system define a second volume, and wherein the second volume is greater than the first volume. Providing the module with a smaller volume than the aerosol-generating system may further facilitate the module remaining attached to the aerosol-generating system during use of the aerosol-generating system. Preferably, the second volume is at least two times larger than the first volume, more preferably at least three times larger than the first volume, more preferably at least four times larger than the first volume, more preferably at least five times larger than the first volume.

A module according to the present invention comprises a data connector configured to connect to a data coupling of an electrically operated aerosol-generating system, which advantageously allows the module to interact with the electrically operated aerosol-generating system and can therefore provide at least one of improved functions and additional functions to an existing electrically operated aerosol-generating system. For example, the module may be configured to transmit data to the electrically operated aerosol-generating system, via the data connector and the data coupling, wherein the data modifies the operation of the electrically operated aerosol-generating system.

The data connector may comprise a wireless connector for establishing a wireless connection with the data coupling of the electrically operated aerosol-generating system. For example, the data connector may be a wireless connector configured to communicate with a wireless data coupling of the electrically operated aerosol-generating system using at least one wireless protocol selected from Bluetooth, ZigBee, Wi-Fi, and Ultra-wideband. Using a wireless connector can advantageously allow the construction of a module having a relatively simple external profile as there may be no need to accommodate an external, physical connector. Wireless connectors also eliminate the risk of damage and contamination inherent to an externally, physical connector.

Additionally, or alternatively, the data connector may comprise at least one module data electrical contact for contacting at least one system data electrical contact forming part of the data coupling of the electrically operated aerosol-generating system. For example, the at least one module data electrical contact may form part of a standardised electrical connection selected from USB-A, USB-B, USB-C, USB-mini, USB-micro, SD, miniSD, and microSD. The at least one module data electrical contact may form part of a male connector for engaging a female connector forming at least part of the data coupling of the electrically operated aerosol-generating system. Alternatively, the at least one module data electrical contact may form part of a female connector for engaging a male connector forming at least part of the data coupling of the electrically operated aerosol-generating system. Using at least one electrical contact forming part of an external, physical connector may be cheaper and easier to implement than a wireless connection. So-called "wired connections" formed by external, physical connectors may also be less prone to interference than wireless connections.

The data connector may comprise only one type of connector for connecting to a data coupling of an electrically operated aerosol-generating system. Alternatively, the data connector may comprise a plurality of connectors to enable the module to connect to different types of data coupling of different electrically operated aerosol-generating systems. For example, the data connector may comprise at least one wireless connector and at least one module data electrical contact for contacting at least one system data electrical contact of an electrically operated aerosol-generating system. The data connector may comprise any number and combination of the different types of wireless connectors and standardised electrical connections described above.

In any of the embodiments described above, the module may further comprise a power connector for receiving a supply of electrical energy from the electrically operated aerosol-generating system.

The power connector may comprise a wireless power connector for wirelessly receiving a supply of electrical energy from the electrically operated aerosol-generating system. For example, the wireless power connector may comprise an induction coil for receiving the supply of electrical energy.

Additionally, or alternatively, the power connector may comprise at least one module power electrical contact for contacting at least one system power electrical contact and receiving a supply of electrical energy from the electrically operated aerosol-generating system. In those embodiments in which the data connector comprises at least one module data electrical contact, the at least one module power electrical contact and the at least one module data electrical contact may both form part of a combined power and data connector. For example, the combined power and data connector may comprise a standardised electrical connection configured for power and data transfer, such as USB-A, USB-B, USB-C, USB-mini, USB-micro, SD, miniSD, and microSD.

The module may be configured to operate using only a supply of electrical energy received from the electrically operated aerosol-generating system via a power connector. Additionally, or alternatively, the module may comprise a module supply of electrical energy for powering the module. For example, the module may comprise at least one battery for powering the module. Preferably, the at least one battery comprises at least one rechargeable battery. The battery may be a Nickel-metal hydride battery, a Nickel cadmium battery, or a Lithium based battery, for example a Lithium-Cobalt, a Lithium-Iron-Phosphate or a Lithium-Polymer battery. The module may comprise a battery connector for receiving an external supply of electrical energy for recharging the at least one rechargeable battery. In those embodiments in which the module comprises a power connector for receiving a supply of electrical energy from the electrically operated aerosol-generating system, the power connector may function as a battery connector so that the supply of electrical energy received from the electrically operated aerosol-generating system charges the at least one rechargeable battery. The same power connector may also be configured to connect to an alternative external source of electrical energy, such as a mains operated charger or a computing device, for recharging the at least one rechargeable battery. Alternatively, the battery connector may be a dedicated connector for recharging the at least one rechargeable battery using an alternative external source of electrical energy, wherein the battery connector cannot be connected to an electrically operated aerosol-generating system for receiving a supply of electrical energy from the electrically operated aerosol-generating system.

In any of the embodiments described above, the module may further comprise at least one module data storage device configured for at least one of: storing data comprising a set of instructions for execution by a microprocessor; storing data for transmission to the electrically operated aerosol-generating system via the data connector; and storing data received from the electrically operated aerosol-generating system via the data connector.

Data stored on the at least one module data storage device may comprise authentication data to enable an authenticated data connection between the module and an electrically operated aerosol-generating system. For example, the authentication data may be passed to the electrically operated aerosol-generating system via the data connector and the data coupling to an authentication system within the electrically operated aerosol-generating system.

Alternatively, the authentication data may be used by an authentication system within the module for authenticating authentication data received from an electrically operated aerosol-generating system connected to the module.

Additionally, or alternatively, data stored on the at least one module data storage device may comprise data representing one or more heating profiles for heating one or more aerosol-generating substrates within the electrically operated aerosol-generating system. For example, the data representing one or more heating profiles may be transmitted to the electrically operated aerosol-generating system via the data connector and the data coupling and used to replace one or more existing heating profiles already stored within the electrically operated aerosol-generating system. Additionally, or alternatively, the data representing one or more heating profiles may be transmitted to the electrically operated aerosol-generating system via the data connector and the data coupling to supplement existing heating profiles already stored within the electrically operated aerosol-generating system.

Additionally, or alternatively, the data stored on the at least one module data storage device may comprise a firmware update for updating or replacing existing firmware within the electrically operated aerosol-generating system.

In any of the embodiments described above in which the module comprises data stored on the at least one module data storage device, the module may be configured to transmit the data stored on the at least one module data storage device directly to the electrically operated aerosol-generating system when the data connector is connected to the data coupling of the electrically operated aerosol-generating system. For example, in embodiments in which the electrically operated aerosol-generating system comprises a system microprocessor, data representing one or more heating profiles may be transmitted directly from the at least one module data storage device to the electrically operated aerosol-generating system for execution by the system microprocessor in the electrically operated aerosol-generating system.

Additionally, or alternatively, the module may further comprise a module microprocessor configured to receive data stored on the at least one module data storage device, operate on the data received from the at least one module data storage device to generate output data, and transmit the output data to the electrically operated aerosol-generating system via the data connector. This arrangement may be preferred in embodiments in which the electrically operated aerosol-generating system does not comprise a system microprocessor to execute or otherwise operate on data received from the module data storage device.

In any of the embodiments described above, the module may further comprise a module attachment connector for cooperating with a system attachment connector on the electrically operated aerosol-generating system for attaching the module to the electrically operated aerosol-generating system. For example, the module attachment connector may be configured to cooperate with the system attachment connector by at least one of an interference fit, a screw connection, a bayonet connection, and a magnetic connection.

The module may have any suitable size and shape to facilitate attachment of the module to the electrically operated aerosol-generating system during operation of the electrically operated aerosol-generating system. In those embodiments in which the electrically operated aerosol-generating system has an elongate shape, preferably the module is configured to attach to an end of the electrically operated aerosol-generating system. Preferably, the module has a cross-sectional shape substantially the same as a cross-sectional shape of the electrically operated aerosol-generating system. In those embodiments in which the electrically operated aerosol-generating system has a substantially circular cross-sectional shape, the module may also have a substantially circular cross-sectional shape. Preferably, the outer diameter of the module is substantially the same as the outer diameter of the electrically operated aerosol-generating system at the location on the electrically operated aerosol-generating system to which the module attaches. The module may have a width of between approximately 5 millimetres and approximately 30 millimetres. In those embodiments in which the module has a substantially circular cross-sectional shape, the module may have an external diameter of between approximately 5 millimetres and approximately 30 millimetres.

In any of the embodiments described above, the module may further comprise at least one of an electrical switch, an optoelectronic device, a speaker, a microphone, a wireless communication device, and a lanyard attachment.

In those embodiments in which the module comprises an electrical switch, the switch may provide an on/off function to at least one of the module and the electrically operated aerosol-generating system. Additionally, or alternatively, the electrical switch may enable switching between various preset settings stored within the module. For example, the preset settings may provide low, medium and high aerosol deliveries to the consumer from the electrically operated aerosol-generating system. The preset settings may be factory set presets, or they may be customisable by the user so that the switch enables switching between different consumer-customised preset settings.

In those embodiments in which the module comprises an optoelectronic device, the optoelectronic device may comprise at least one of a light, such as a light emitting diode, a laser, a camera, and a biometric identification device.

A light, such as a light emitting diode, may be used to indicate to the consumer a state of at least one of the module and the electrically operated aerosol-generating system. For example, the light may illuminate or flash to indicate at least one of: activation of at least one of the module and the electrically operated aerosol-generating system; the consumer puffing on the electrically operated aerosol-generating system; a preset setting that has been selected; a level of charge of a battery within at least one of the module and the electrically operated aerosol-generating system; whether authentication between the module and the electrically operated aerosol-generating system has been successful; and an error relating to a function of at least one of the module and the electrically operated aerosol-generating system. In those embodiments in which the module comprises a light, such as a light emitting diode, that illuminates when the consumer puffs on the electrically operated aerosol-generating system, the light may be located on the module so that, when the module is attached to the electrically operated aerosol-generating system, the light is positioned at the end of the electrically operated aerosol-generating system and simulates a lit end of a conventional cigarette.

A biometric identification device may comprise a fingerprint scanner, an iris scanner, or another device for optically recognising biometric data. A biometric identification device may be used to authenticate a user before the electrically operated aerosol-generating system can be used.

A laser may allow use of the module as a laser pointer, particularly when the module is attached to an elongate electrically operated aerosol-generating system.

In those embodiments in which the module comprises a camera, images recorded by the camera may be stored within a module data storage device, a system data storage device within the electrically operated aerosol-generating system, or both.

In those embodiments in which the module comprises a speaker, the speaker may be used to emit audible sounds indicative of the operation of at least one of the module and the electrically operated aerosol-generating system. For example, the speaker may emit an audible indication of at least one of: activation of at least one of the module and the electrically operated aerosol-generating system; the consumer puffing on the electrically operated aerosol-generating system; a preset setting that has been selected; a level of charge of a battery within at least one of the module and the electrically operated aerosol-generating system; whether authentication between the module and the electrically operated aerosol-generating system has been successful; and an error relating to a function of at least one of the module and the electrically operated aerosol-generating system. Additionally, or alternatively, the speaker may be used to emit sounds not related to the operation of the electrically operated aerosol-generating system, such as music stored on a module data storage device within the module.

In those embodiments in which the module comprises a microphone, the microphone may be used to control one or more functions of at least one of the module and the electrically operated aerosol-generating system. For example, the module may be configured to use the microphone to enable voice authentication of a user to prevent unauthorised use of the electrically operated aerosol-generating system. Additionally, or alternatively, the microphone may enable the use of voice commands to control one or more functions of at least one of the module and the electrically operated aerosol-generating system.

In those embodiments in which the module comprises a wireless communication device, the wireless communication device may function as the data connector for wirelessly connecting the module with the data coupling of the electrically operated aerosol-generating system in addition to providing one or more additional wireless communication functions. Alternatively, the wireless communication device maybe in addition to a wireless connector for connecting with the data coupling of the electrically operated aerosol-generating system, or the wireless communication device may be an alternative to a wireless connector for connecting with the data coupling of the electrically operated aerosol-generating system. The wireless communication device may be configured to communicate using at least one wireless protocol selected from Bluetooth, ZigBee, Wi-Fi, and Ultra-wideband. For example, the wireless communication device may comprise a Wi-Fi communication device for providing wireless connection of the module to at least one of a local area network and an internet connection. Additionally, or alternatively, the wireless communication device may comprise a Bluetooth communication device for communicating with other Bluetooth-enabled devices. For example, in those embodiments in which the module comprises a camera, the Bluetooth communication device may be used to transfer images captured using the camera to another Bluetooth-enabled device. Additionally, or alternatively, in those embodiments in which the module comprises a speaker, the Bluetooth communication device may enable streaming of music from another Bluetooth-enabled device for playback via the module speaker. Additionally, or alternatively, in those embodiments in which the module comprises a speaker and a microphone, the Bluetooth communication device may connect with a Bluetooth-enabled phone so that the module functions as a microphone and a loudspeaker in a similar manner to a Bluetooth enabled headset.

The electrically operated aerosol-generating system may comprise a reusable aerosol-generating device and a disposable aerosol-generating article. The aerosol-generating device may comprise the aerosol-generating substrate. The aerosol-generating article may comprise the aerosol-generating substrate. The aerosol-generating device may comprise the electric heater, the supply of electrical energy, and the data coupling. The electric heater may form part of the aerosol-generating article or part of the aerosol-generating device. The electric heater may be provided separately from the aerosol-generating article and the aerosol-generating device, wherein the electric heater is combined with the aerosol-generating article and the aerosol-generating device to form the aerosol-generating system.

The data coupling may comprise a wireless connector for establishing a wireless connection with the data connector of the module. For example, the data coupling may be a wireless connector configured to communicate with a wireless data connector of the module using at least one wireless protocol selected from Bluetooth, ZigBee, Wi-Fi, and Ultra-wideband.

Additionally, or alternatively, the data coupling may comprise at least one system data electrical contact for contacting at least one module data electrical contact forming part of the data connector of the module. For example, the at least one system data electrical contact may form part of a standardised electrical connection selected from USB-A, USB-B, USB-C, USB-mini, USB-micro, SD, miniSD, and microSD. The at least one system data electrical contact may form part of a male connector for engaging a female connector forming at least part of the data connector of the module. Alternatively, the at least one system data electrical contact may form part of a female connector for engaging a male connector forming at least part of the data connector of the module.

In any of the embodiments described above, the electrically operated aerosol-generating system may further comprise a power connector for providing electrical energy from the supply of electrical energy to the module.

The power connector may comprise a wireless power connector for wirelessly providing electrical energy to the module. For example, the wireless power connector may comprise an induction coil for providing the electrical energy.

Additionally, or alternatively, the power connector may comprise at least one system power electrical contact for contacting at least one module electrical contact and providing electrical energy to the module. In those embodiments in which the data coupling comprises at least one system data electrical contact, the at least one system power electrical contact and the at least one system data electrical contact may both form part of a combined power and data coupling. For example, the combined power and data coupling may comprise a standardised electrical connection configured for power and data transfer, such as USB-A, USB-B, USB-C, USB-mini, USB-micro, SD, miniSD, and microSD.

In any of the embodiments described above, the electrically operated aerosol-generating system may further comprise a system attachment connector for cooperating with a module attachment connector on the module for attaching the module to the electrically operated aerosol-generating system. For example, the system attachment connector may be configured to cooperate with the module attachment connector by at least one of an interference fit, a screw connection, a bayonet connection, and a magnetic connection.

In any of the embodiments described above, the supply of electrical energy may comprise at least one battery. For example, the supply of electrical energy may comprise a Nickel-metal hydride battery, a Nickel cadmium battery, or a Lithium based battery, for example a Lithium-Cobalt, a Lithium-Iron-Phosphate or a Lithium-Polymer battery. The supply of electrical energy may alternatively be another form of charge storage device, such as a capacitor. The supply of electrical energy may require recharging and may have a capacity that allows for the storage of enough energy for multiple uses of the aerosol-generating system.

In any of the embodiments described above, the electric heater may comprise at least one heating element. In some embodiments, the electric heater comprises a plurality of heating elements, for example two, or three, or four, or five, or six or more heating elements. The heating element or heating elements may be arranged appropriately so as to most effectively heat the aerosol-generating substrate.

The at least one electric heating element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium- zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation, 1999 Broadway Suite 4300, Denver Colo. In composite materials, the electrically resistive material may optionally be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise Kapton®, all-polyimide or mica foil. Kapton® is a registered trade mark of E.I. du Pont de Nemours and Company, 1007 Market Street, Wilmington, Del. 19898, United States of America.

Alternatively, the at least one electric heating element may comprise an infra-red heating element, a photonic source, or an inductive heating element.

The at least one electric heating element may take any suitable form. For example, the at least one electric heating element may take the form of a heating blade. Alternatively, the at least one electric heating element may take the form of a casing or substrate having different electro-conductive portions, or an electrically resistive metallic tube. If the aerosol-generating substrate is a liquid provided within a container, the container may incorporate a disposable heating element. Alternatively, one or more heating needles or rods that run through the centre of the aerosol-generating substrate may also be suitable. Alternatively, the at least one electric heating element may be a disc (end) heating element or a combination of a disc heating element with heating needles or rods. Alternatively, the at least one electric heating element may comprise a flexible sheet of material arranged to surround or partially surround the aerosol-generating substrate. Other alternatives include a heating wire or filament, for example a Ni—Cr, platinum, tungsten or alloy wire, or a heating plate. Optionally, the heating element may be deposited in or on a rigid carrier material.

The at least one electric heating element may comprise a heat sink, or heat reservoir comprising a material capable of absorbing and storing heat and subsequently releasing the heat over time to the aerosol-generating substrate. The heat sink may be formed of any suitable material, such as a suitable metal or ceramic material. Preferably, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy.

The heat sink or heat reservoir may be arranged such that it is directly in contact with the aerosol-generating substrate and can transfer the stored heat directly to the substrate. Alternatively, the heat stored in the heat sink or heat reservoir may be transferred to the aerosol-generating substrate by means of a heat conductor, such as a metallic tube.

The at least one heating element may heat the aerosol-generating substrate by means of conduction. The heating element may be at least partially in contact with the substrate, or the carrier on which the substrate is deposited. Alternatively, the heat from the heating element may be conducted to the substrate by means of a heat conductive element.

Alternatively, the at least one heating element may transfer heat to the incoming ambient air that is drawn through the electrically heated aerosol generating system during use, which in turn heats the aerosol-generating substrate by convection. The ambient air may be heated before passing through the aerosol-generating substrate. Alternatively, if the aerosol-generating substrate is a liquid substrate, the ambient air may be first drawn through the substrate and then heated.

The aerosol-generating substrate may be a solid aerosol-generating substrate. The aerosol-generating substrate preferably comprises a tobacco-containing material containing volatile tobacco flavour compounds which are released from the substrate upon heating. The aerosol-generating substrate may comprise a non-tobacco material. The aerosol-generating substrate may comprise tobacco-containing material and non-tobacco containing material.

If the aerosol-generating substrate is a solid aerosol-generating substrate, the solid aerosol-generating substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-generating substrate may contain tobacco or non-tobacco volatile flavour compounds, which are released upon heating of the solid aerosol-generating substrate. The solid aerosol-generating substrate may also contain one or more capsules that, for example, include additional tobacco volatile flavour compounds or non-tobacco volatile flavour compounds and such capsules may melt during heating of the solid aerosol-generating substrate.

Optionally, the solid aerosol-generating substrate may be provided on or embedded in a thermally stable carrier. The carrier may take the form of powder, granules, pellets, shreds, strands, strips or sheets. The solid aerosol-generating substrate may be deposited on the surface of the carrier in the form of, for example, a sheet, foam, gel or slurry. The solid aerosol-generating substrate may be deposited on the entire surface of the carrier, or alternatively, may be deposited in a pattern in order to provide a non-uniform flavour delivery during use.

As used herein, the term 'homogenised tobacco material' denotes a material formed by agglomerating particulate tobacco.

As used herein, the term 'sheet' denotes a laminar element having a width and length substantially greater than the thickness thereof.

As used herein, the term 'gathered' is used to describe a sheet that is convoluted, folded, or otherwise compressed or constricted substantially transversely to the longitudinal axis of the aerosol-generating article.

In a preferred embodiment, the aerosol-generating substrate comprises a gathered textured sheet of homogenised tobacco material.

As used herein, the term 'textured sheet' denotes a sheet that has been crimped, embossed, debossed, perforated or otherwise deformed. The aerosol-generating substrate may comprise a gathered textured sheet of homogenised tobacco material comprising a plurality of spaced-apart indentations, protrusions, perforations or a combination thereof.

In a particularly preferred embodiment, the aerosol-generating substrate comprises a gathered crimped sheet of homogenised tobacco material.

Use of a textured sheet of homogenised tobacco material may advantageously facilitate gathering of the sheet of homogenised tobacco material to form the aerosol-generating substrate.

As used herein, the term 'crimped sheet' denotes a sheet having a plurality of substantially parallel ridges or corrugations. Preferably, the substantially parallel ridges or corrugations extend along or parallel to the longitudinal axis of the aerosol-generating system. This advantageously facilitates gathering of the crimped sheet of homogenised tobacco material to form the aerosol-generating substrate. However, it will be appreciated that crimped sheets of homogenised tobacco material for inclusion in the aerosol-generating system may alternatively or in addition have a plurality of substantially parallel ridges or corrugations that are disposed at an acute or obtuse angle to the longitudinal axis of the aerosol-generating system.

The aerosol-generating substrate may be in the form of a plug comprising an aerosol-generating material circumscribed by a paper or other wrapper. Where an aerosol-generating substrate is in the form of a plug, the entire plug including any wrapper is considered to be the aerosol-generating substrate.

The aerosol-generating substrate may comprise a plug comprising a gathered sheet of homogenised tobacco material, or other aerosol-generating material, circumscribed by a wrapper.

As used herein, the term 'aerosol former' is used to describe any suitable known compound or mixture of compounds that, in use, facilitates formation of an aerosol and that is substantially resistant to thermal degradation at the operating temperature of the aerosol-generating article.

Suitable aerosol-formers are known in the art and include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate Preferred aerosol formers are polyhydric alcohols or mixtures thereof, such as propylene glycol, triethylene glycol, 1,3-butanediol and, most preferred, glycerine.

The aerosol-generating substrate may comprise a single aerosol former. Alternatively, the aerosol-generating substrate may comprise a combination of two or more aerosol formers.

The aerosol-generating substrate may have an aerosol former content of greater than 5% on a dry weight basis.

The aerosol aerosol-generating substrate may have an aerosol former content of between approximately 5% and approximately 30% on a dry weight basis.

The aerosol-generating substrate may have an aerosol former content of approximately 20% on a dry weight basis.

Aerosol-generating substrates comprising gathered sheets of homogenised tobacco for use in the aerosol-generating article may be made by methods known in the art, for example the methods disclosed in WO 2012/164009 A2.

Alternative to a solid aerosol-generating substrate, the aerosol-generating substrate may be a liquid aerosol-generating substrate. In one embodiment, the electrically heated aerosol-generating system further comprises a liquid storage portion. Preferably, the liquid aerosol-generating substrate is stored in the liquid storage portion. In one embodiment, the electrically heated aerosol-generating system further comprises a capillary wick in communication with the liquid storage portion. It is also possible for a capillary wick for holding liquid to be provided without a liquid storage portion. In that embodiment, the capillary wick may be preloaded with liquid.

Preferably, the capillary wick is arranged to be in contact with liquid in the liquid storage portion. In that case, in use, liquid is transferred from the liquid storage portion towards the electric heater by capillary action in the capillary wick. In one embodiment, the capillary wick has a first end and a second end, the first end extending into the liquid storage portion for contact with liquid therein and the electric heater being arranged to heat liquid in the second end. When the electric heater is activated, the liquid at the second end of the capillary wick is vaporized by the electric heater to form the supersaturated vapour. The supersaturated vapour is mixed with and carried in the airflow. During the flow, the vapour condenses to form the aerosol and the aerosol is carried towards the mouth of a user. The electric heater in combination with a capillary wick may provide a fast response, because that arrangement may provide a high surface area of liquid to the electric heater.

The liquid substrate may be absorbed into a porous carrier material, which may be made from any suitable absorbent plug or body, for example, a foamed metal or plastics material, polypropylene, terylene, nylon fibres or ceramic. The liquid substrate may be retained in the porous carrier material prior to use of the electrically heated aerosol-generating system or alternatively, the liquid substrate material may be released into the porous carrier material during, or immediately prior to use. For example, the liquid substrate may be provided in a capsule. The shell of the capsule preferably melts upon heating and releases the liquid substrate into the porous carrier material. The capsule may optionally contain a solid in combination with the liquid.

If the aerosol-generating substrate is a liquid substrate, the liquid has physical properties. These include, for example, a boiling point, vapour pressure, and surface tension characteristics to make them suitable for use in the aerosol-generating system. Control of the electric heater may depend upon the physical properties of the liquid substrate. The liquid preferably comprises a tobacco-containing material comprising volatile tobacco flavour compounds which are released from the liquid upon heating. Alternatively, or in addition, the liquid may comprise a non-tobacco material. The liquid may include water, solvents, ethanol, plant extracts and natural or artificial flavours. Preferably, the liquid further comprises an aerosol former. Examples of suitable aerosol formers are glycerine and propylene glycol.

An advantage of providing a liquid storage portion is that a high level of hygiene can be maintained. Using a capillary wick extending between the liquid and the electric heater allows the structure of the device to be relatively simple. The liquid has physical properties, including viscosity and surface tension, which allow the liquid to be transported through the capillary wick by capillary action. The liquid storage portion is preferably a container. The liquid storage portion may not be refillable. Thus, when the liquid in the liquid storage portion has been used up, at least part of the aerosol-generating system is replaced. Alternatively, the liquid storage portion may be refillable. In that case, at least part of the aerosol-generating system may be replaced after a certain number of refills of the liquid storage portion. Preferably, the liquid storage portion is arranged to hold liquid for a pre-determined number of puffs.

The capillary wick may have a fibrous or spongy structure. The capillary wick preferably comprises a bundle of capillaries. For example, the capillary wick may comprise a plurality of fibres or threads, or other fine bore tubes. The fibres or threads may be generally aligned in the longitudinal direction of the aerosol-generating system. Alternatively, the capillary wick may comprise sponge-like or foam-like material formed into a rod shape. The rod shape may extend along the longitudinal direction of the aerosol-generating system. The structure of the wick forms a plurality of small bores or tubes, through which the liquid can be transported to the electric heater, by capillary action. The capillary wick may comprise any suitable material or combination of materials. Examples of suitable materials are ceramic- or graphite-based materials in the form of fibres or sintered powders. The capillary wick may have any suitable capillarity and porosity so as to be used with different liquid physical properties such as density, viscosity, surface tension and vapour pressure. The capillary properties of the wick, combined with the properties of the liquid, ensure that the wick is always wet in the heating area.

The aerosol-generating substrate may alternatively be any other sort of substrate, for example, a gas substrate, or any combination of the various types of substrate.

The electrically heated aerosol-generating system may comprise an aerosol-generating chamber in which aerosol forms from a super saturated vapour, which aerosol is then carried into the mouth of a user. An air inlet, air outlet and the chamber are preferably arranged so as to define an airflow route from the air inlet to the air outlet via the aerosol-generating chamber, so as to convey the aerosol to the air outlet and into the mouth of a user.

Preferably, a housing of the aerosol-generating system is elongate. The structure of the housing, including the surface area available for condensation to form, will affect the aerosol properties and whether there is liquid leakage from the system. The housing may comprise a shell and a mouthpiece. In that case, all the components may be contained in either the shell or the mouthpiece. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle. The material of the housing may affect the amount of condensation forming on the housing which will, in turn, affect liquid leakage from the system.

Preferably, the aerosol-generating system is portable. The aerosol-generating system may be a smoking device and may have a size comparable to a conventional cigar or cigarette. The smoking device may have a total length between approximately 30 millimetres and approximately 150 millimetres. The smoking device may have an external diameter between approximately 5 millimetres and approximately 30 millimetres.

The invention will be further described, by way of example only, with reference to the accompanying drawings in which.

Figure 1:
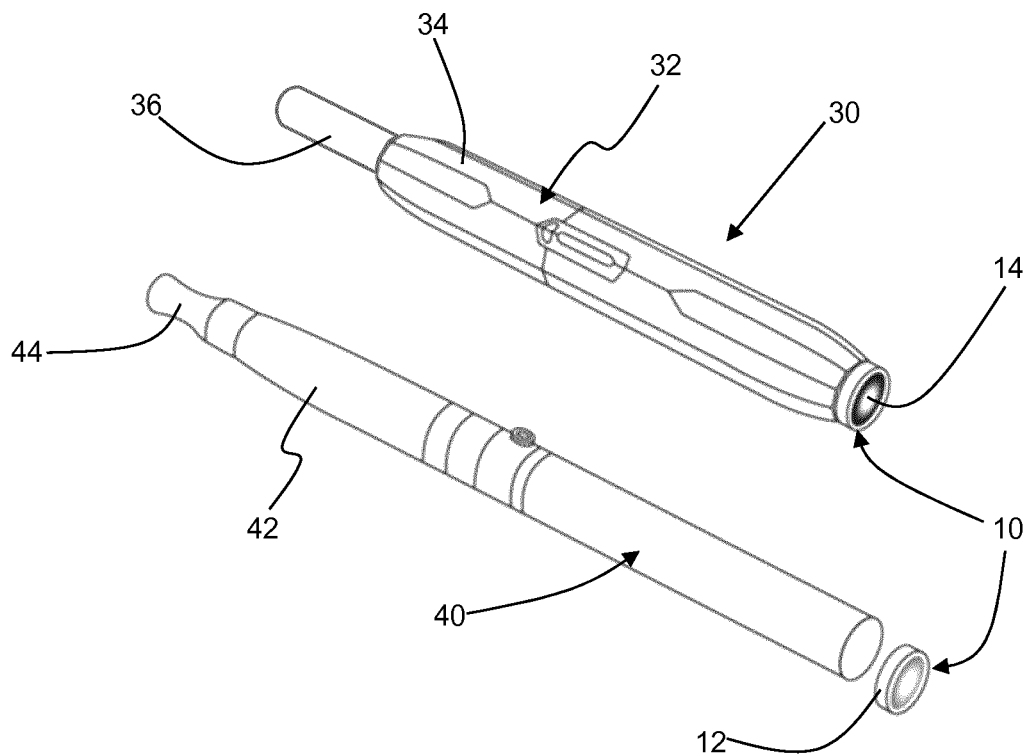
FIG. 1 shows two examples of electrically operated aerosol-generating systems each in combination with a module according to the present invention.

FIG. 1 shows two examples of electrically operated aerosol-generating systems each in combination with a module 10 according to the present invention. The first electrically operated aerosol-generating system 30 is a heated tobacco system in which a solid tobacco substrate is heated to form an aerosol. The electrically operated aerosol-generating system 30 comprises an aerosol-generating device 32 comprising a housing 34 and a battery, an electric heater, and control electronics, all contained within the housing 34. The housing 34 comprises a cavity for receiving disposable aerosol-generating articles 36, each article comprising a solid tobacco substrate.

The second electrically operated aerosol-generating system 40 comprises a housing 42 containing a battery, an electric heater, control electronics, and a reservoir filled with a liquid nicotine formulation. A mouthpiece 44 is positioned at an upstream end of the housing 42. A wick wicks the liquid nicotine formulation from the reservoir to the electric heater. The reservoir is configured to be at least one of refillable and replaceable.

The module 10 comprises a disc-shaped housing 12 containing the electrical components of the module 10. A downstream end of the disc-shaped housing 12 may be provided with a light 14, such as a light emitting diode, wherein the light is configured to illuminate each time a user puffs on the electrically operated aerosol-generating system. An upstream end of the disc-shaped housing 12 is configured to attach to a downstream end of each electrically operated aerosol-generating system 30, 40 using an interference fit. The diameter of the module 10 is substantially the same as the diameter of the downstream end of each electrically operated aerosol-generating system housing 34, 42.

Figure 2:
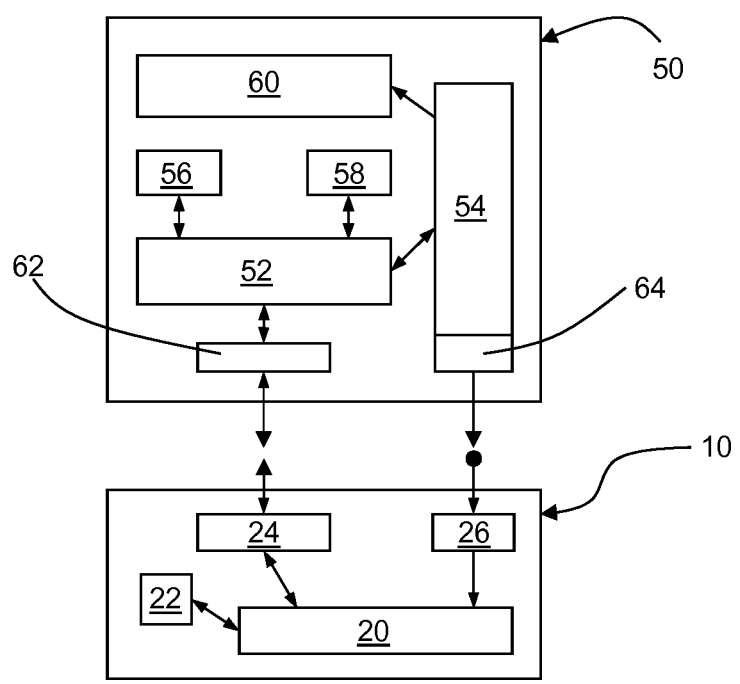
FIG. 2 shows a block diagram of the electrical configuration of an electrically operated aerosol-generating system and a module, in accordance with a first embodiment of the present invention.

FIG. 2 shows a block diagram of the electrical configuration of an electrically operated aerosol-generating system 50 and the module 10, in accordance with a first embodiment of the present invention. The electrically operated aerosol-generating system 50 comprises a system microprocessor 52, a battery 54, one or more sensors 56, a system data storage device 58, an electric heater 60, a data coupling 62, and a power coupling 64. The system microprocessor 52 manages the supply of electrical current from the battery 54 to the electric heater 60 for heating an aerosol-generating substrate received within the electrically operated aerosol-generating system 50. The system microprocessor 52 also manages data exchange with the system data storage device 58 and receives data from the one or more sensors 56. The one or more sensors 56 may include at least one of a temperature sensor and an airflow sensor.

The module 10 comprises a module microprocessor 20, a module data storage device 22, a data connector 24 and a power connector 26. When the module 10 is attached to the electrically operated aerosol-generating system 50 the power connector 26 on the module 10 connects to the power coupling 64 on the electrically operated aerosol-generating system 50 to enable the transfer of electrical energy from the battery 54 to the module 10. Similarly, the data connector 24 on the module connects to the data coupling 62 on the electrically operated aerosol-generating system 50 to enable data transfer between the module 10 and the electrically operated aerosol-generating system 50. In the embodiment shown in FIG. 2, the data connector 26, the data coupling 62, the power connector 26 and the power coupling 64 each comprise one or more electrical contacts to provide a physical data or power connection. For example, the electrical contacts may form part of a standardised electrical connection, such as a USB connection.

The module data storage device 22 contains data for transmission to the electrically operated aerosol-generating system 50 via the data connector 24 and the data coupling 62. The data may comprise at least one of: updated or new heating profiles for heating one or more aerosol-generating substrates; updated firmware for the electrically operated aerosol-generating system 50; and authentication data to enable authentication of the module 10 with the electrically operated aerosol-generating system 50.

Figure 3:
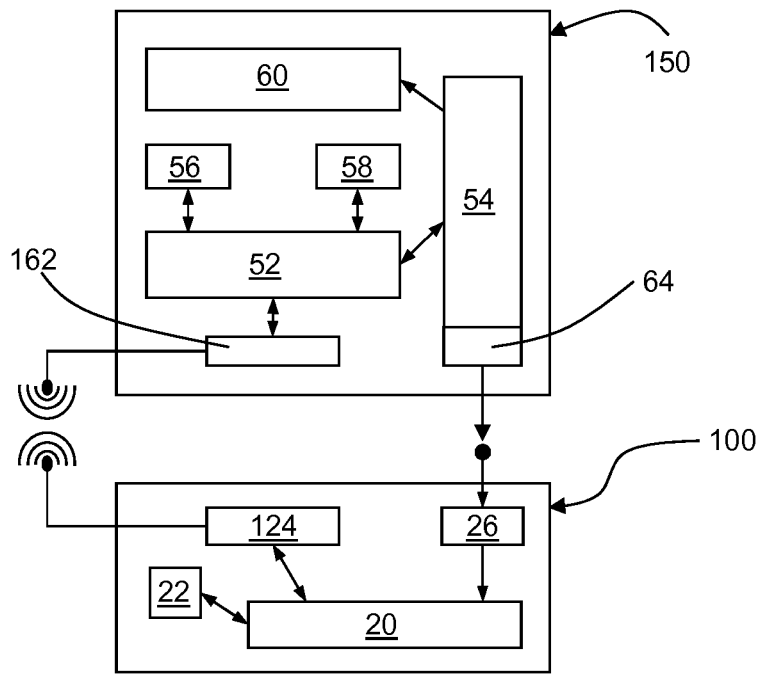
FIG. 3 shows a block diagram of the electrical configuration of an electrically operated aerosol-generating system and a module, in accordance with a second embodiment of the present invention.

FIG. 3 shows an alternative electrically operated aerosol-generating system 150 in combination with an alternative module 100, in accordance with a second embodiment of the present invention. The electrically operated aerosol-generating system 150 and the module 100 are substantially the same as the electrically operated aerosol-generating system 50 and the module 10 described with reference to FIG. 2, with the exception of the data connector and the data coupling. Like reference numerals are therefore used to designate like parts.

In the embodiment shown in FIG. 3, the electrically operated aerosol-generating system 150 comprises a wireless data coupling 162 and the module 100 comprises a wireless data connector 124. The wireless data coupling 162 and the wireless data connector 124 are configured to communicate with each other using a wireless communication protocol such as Bluetooth.

Figure 4:
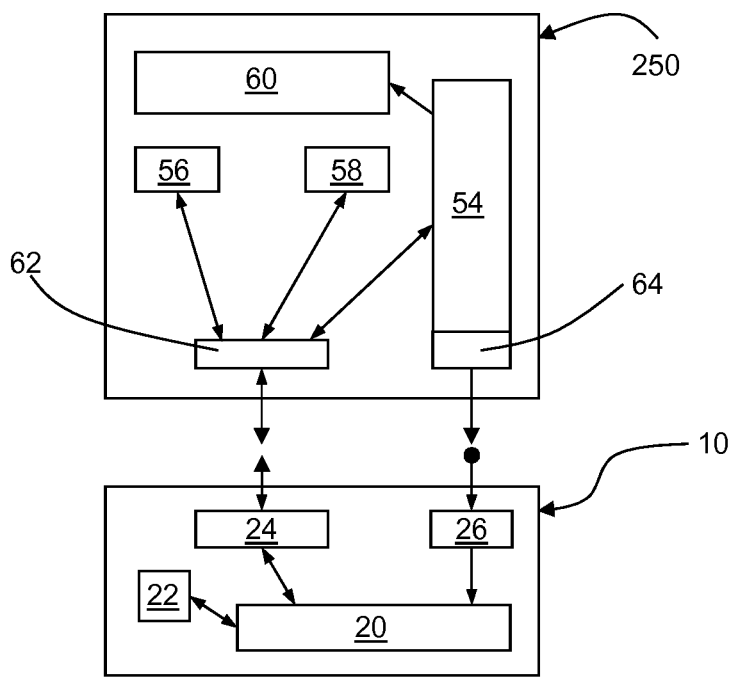
FIG. 4 shows a block diagram of the electrical configuration of an electrically operated aerosol-generating system and a module, in accordance with a third embodiment of the present invention.

FIG. 4 shows an alternative electrically operated aerosol-generating system 250 in combination with the module 10 shown in FIG. 2. The electrically operated aerosol-generating system 250 is substantially the same as the electrically operated aerosol-generating system 50 described with reference to FIG. 2 and like reference numerals therefore designate like parts.

In the embodiment shown in FIG. 4, the electrically operated aerosol-generating system 250 does not comprise a system microprocessor. Instead, the battery 54, the one or more sensors 56 and the system data storage device 58 are in direct communication with the data coupling 62, and the module microprocessor 20 directly controls the electrically operated aerosol-generating system 250 via the data connector 24 and the data coupling 62.

The invention claimed is:

1. A kit, comprising:
a module and an electrically operated aerosol-generating system, the electrically operated aerosol-generating system comprising:
an electric heater configured to heat an aerosol-generating substrate;
a supply of electrical energy;
a data coupling; and
a system attachment connector;
the module comprising:
a data connector configured to connect to the data coupling of the electrically operated aerosol-generating system;
at least one module data storage device configured for at least one of: storing data comprising a set of instructions for execution by a microprocessor, storing data for transmission to the electrically operated aerosol-generating system via the data connector, and storing data received from the electrically operated aerosol-generating system via the data connector; and
a module attachment connector configured to cooperate with the system attachment connector on the electrically operated aerosol-generating system to attach the module to the electrically operated aerosol-generating system,
wherein external dimensions of the module define a first volume,
wherein external dimensions of the electrically operated aerosol-generating system define a second volume, and
wherein the second volume is greater than the first volume.

2. The kit according to claim 1, wherein the data connector of the module comprises a wireless connector configured to establish a wireless connection with the data coupling of the electrically operated aerosol-generating system.

3. The kit according to claim 2, wherein the wireless connector is configured to communicate with the data coupling of the electrically operated aerosol-generating system using at least one wireless protocol selected from BLUETOOTH®, ZIGBEE®, WI-FI®, and ultra-wideband.

4. The kit according to claim 1, wherein the data connector of the module comprises at least one module data electrical contact configured to contact at least one system data electrical contact forming part of the data coupling of the electrically operated aerosol-generating system.

5. The kit according to claim 4, wherein the at least one module data electrical contact forms part of a standardized electrical connection selected from USB-A, USB-B, USB-C®, USB-mini, USB-micro, SD®, mini-SD, and micro-SD.

6. The kit according to claim 1, wherein the module further comprises a power connector configured to receive a supply of electrical energy from the electrically operated aerosol-generating system.

7. The kit according to claim 6,
wherein the power connector of the module comprises at least one module power electrical contact,
wherein the data connector of the module comprises at least one module data electrical contact, and
wherein the at least one module power electrical contact and the at least one module data electrical contact both form part of a combined power and data connector.

8. The kit according to claim 1, further comprising data stored on the at least one module data storage device, the data comprising at least one of: authentication data, one or more heating profiles for heating one or more aerosol-generating substrates within the electrically operated aerosol-generating system, and a firmware update for replacing or updating firmware within the electrically operated aerosol-generating system.

9. The kit according to claim 8, wherein the module is configured to transmit the data stored on the at least one module data storage device directly to the electrically operated aerosol-generating system when the data connector of the module is connected to the data coupling of the electrically operated aerosol-generating system.

10. The kit according to claim 8, wherein the module further comprises a module microprocessor configured to: receive the data stored on the at least one module data storage device, operate on the data received from the at least one module data storage device to generate output data, and transmit the output data to the electrically operated aerosol-generating system via the data connector.

11. The kit according to claim 1, wherein the module attachment connector is configured to cooperate with the system attachment connector by at least one of an interference fit, a screw connection, a bayonet connection, and a magnetic connection.

12. The kit according to claim 1, wherein the module further comprises at least one of an electrical switch, an optoelectronic device, a speaker, a microphone, a wireless communication device, and a lanyard attachment.

* * * * *